(12) United States Patent
Zhou et al.

(10) Patent No.: US 9,927,566 B2
(45) Date of Patent: Mar. 27, 2018

(54) ELECTROMAGNETIC INDUCTION ANTENNA PLATE, BACK-LIGHT AND DISPLAY DEVICE

(75) Inventors: Hao Zhou, Beijing (CN); Qing Ma, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 474 days.

(21) Appl. No.: 13/699,218

(22) PCT Filed: Jul. 20, 2012

(86) PCT No.: PCT/CN2012/078979
§ 371 (c)(1),
(2), (4) Date: Nov. 20, 2012

(87) PCT Pub. No.: WO2013/013600
PCT Pub. Date: Jan. 31, 2013

(65) Prior Publication Data
US 2013/0188395 A1 Jul. 25, 2013

(30) Foreign Application Priority Data
Jul. 22, 2011 (CN) .......................... 2011 2 0262540

(51) Int. Cl.
*F21V 8/00* (2006.01)
*G06F 3/046* (2006.01)
*G06F 3/041* (2006.01)

(52) U.S. Cl.
CPC ............ *G02B 6/0011* (2013.01); *G06F 3/046* (2013.01); *G06F 3/0412* (2013.01)

(58) Field of Classification Search
USPC ..... 362/627, 630, 631; 349/58, 59; 345/179, 345/173–175
See application file for complete search history.

(56) References Cited

U.S. PATENT DOCUMENTS 5,274,198 A * 12/1993 Landmeier .............. G06F 3/041
178/18.08
6,215,476 B1 4/2001 Depew et al.
(Continued)

FOREIGN PATENT DOCUMENTS

| CN | 1534333 A | 10/2004 |
|---|---|---|
| CN | 1534335 A | 10/2004 |
| CN | 202133987 A | 2/2012 |

OTHER PUBLICATIONS

International Preliminary Report on Patentability dated Jan. 28, 2014, PCT/CN2012/078979.
(Continued)

*Primary Examiner* — Jong-Suk (James) Lee
*Assistant Examiner* — Christopher E Dunay
(74) *Attorney, Agent, or Firm* — Ladas & Parry LLP

(57) ABSTRACT

Embodiments of the invention provides an electromagnetic induction antenna plate, a backlight and a display device, and the electromagnetic induction antenna plate comprises a wiring layer and a fixing structure for attaching the wiring layer to a back plate of a backlight, wherein the wiring layer comprises a first surface facing the back plate and a second surface coated with a reflective material and facing a light guide plate of the backlight when mounted to the backlight.

10 Claims, 4 Drawing Sheets

(56) References Cited

U.S. PATENT DOCUMENTS

| | | | |
|---|---|---|---|
| 7,145,766 B2* | 12/2006 | Homer et al. | 361/679.17 |
| 7,492,433 B2* | 2/2009 | Imajo et al. | 349/149 |
| 7,760,284 B2* | 7/2010 | Murase | 349/58 |
| 2004/0004680 A1* | 1/2004 | Kim | 349/58 |
| 2004/0041796 A1* | 3/2004 | Lee | G06F 3/0414 |
| | | | 345/173 |
| 2004/0130538 A1* | 7/2004 | Lin | G02F 1/13338 |
| | | | 345/178 |
| 2004/0189587 A1 | 9/2004 | Jung et al. | |
| 2004/0189887 A1* | 9/2004 | You | G02F 1/13338 |
| | | | 349/58 |
| 2005/0030443 A1* | 2/2005 | Nagahama | 349/64 |
| 2005/0168992 A1* | 8/2005 | Hirose | 362/296 |
| 2005/0265048 A1* | 12/2005 | Wang | G02B 6/0055 |
| | | | 362/612 |
| 2006/0038933 A1* | 2/2006 | Hashimoto | 349/58 |
| 2007/0263407 A1* | 11/2007 | Sakai | G02B 6/0021 |
| | | | 362/608 |
| 2010/0165231 A1* | 7/2010 | Ho et al. | 349/58 |
| 2010/0171891 A1 | 7/2010 | Kaji et al. | |
| 2010/0188340 A1* | 7/2010 | Smoot | 345/173 |
| 2010/0259503 A1* | 10/2010 | Yanase et al. | 345/174 |
| 2011/0043724 A1* | 2/2011 | Kim | 349/65 |
| 2011/0242039 A1* | 10/2011 | Kalis et al. | 345/174 |
| 2012/0182494 A1* | 7/2012 | Yu | G02B 6/0055 |
| | | | 349/61 |
| 2012/0313863 A1* | 12/2012 | Hsu | 345/173 |
| 2013/0077035 A1* | 3/2013 | Kanzaki et al. | 349/123 |

OTHER PUBLICATIONS

International Search Report dated Jan. 11, 2012; PCT/CN2012/078979.

* cited by examiner

ELECTROMAGNETIC INDUCTION ANTENNA PLATE, BACK-LIGHT AND DISPLAY DEVICE

TECHNICAL FIELD

Embodiments of the invention relate to an electromagnetic induction antenna plate, a backlight, and a display device.

BACKGROUND

The basic mechanism of an electromagnetic induction touch screen in the current technology is that a magnetic field change occurs between an electromagnetic pen and an inductor provided underneath the panel of the screen during the movement of the electromagnetic pen on the screen surface, and a touch signal is produced and collected according to the produced magnetic field change. An electromagnetic touch device comprises an electromagnetic induction touch control plate, an electromagnetic induction antenna plate, an electromagnetic pen, and a liquid crystal display (LCD) module. The electromagnetic pen acts as a signal emitting terminal, and the electromagnetic induction antenna plate acts as a signal receiving terminal.

Currently, an electromagnetic induction antenna plate is typically enclosed into a backlight for a display device. As shown in FIG. 1, an electromagnetic induction antenna plate comprises a wiring layer 11, a silicon steel sheet 12 and a flexible printed circuit (FPC) fixing structure 13. When the electromagnetic induction antenna plate is enclosed into a backlight 20 of a display device, as shown in FIG. 2, the FPC fixing structure 13 with folded structures is attached to the reflecting sheet 14 of the backlight 20, so that the wiring layer 1 and the silicon steel sheet 12 within the FPC fixing structure 13 are fixed together with the back plate of the backlight 20. As shown, the backlight 20 is provided behind a display panel 10 of the display device.

However, when the electromagnetic induction antenna plate is mounted into the backlight, the total thickness of the display device will increase. For example, a gap exists between the wiring layer 11 and the reflecting plate 14, since the FPC fixing structure has a thickness.

SUMMARY

An embodiment of the invention provides an electromagnetic induction antenna plate comprising a wiring layer, and a fixing structure for attaching the wiring layer to a back plate of a backlight, wherein the wiring layer comprises a first surface and a second surface, and after the electromagnetic induction antenna plate is mounted to the backlight, the first surface of the wiring layer faces the back plate of the backlight, and the second surface of the wiring layer is coated with a reflective material and faces a light guide plate of the backlight.

Another embodiment of the invention provides a backlight comprising a back plate, a light guide plate, an electromagnetic induction antenna plate that is provided between the light guide plate and the back plate, wherein the electromagnetic induction antenna plate comprises: a wiring layer, and a fixing structure for attaching the wiring layer to the back plate, wherein the wiring layer comprises a first surface and a second surface, the first surface of the wiring layer faces the back plate of the backlight, and the second surface of the wiring layer is coated with a reflective material and faces a light guide plate of the backlight.

Still another embodiment of the invention provides a display device comprising the backlight described above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

The embodiment will be further described in connection with the drawings. It is obvious that the embodiments described below are just a part but not all of the embodiments of the invention. Based on the described embodiments herein, those skilled in the art can obtain other embodiment(s), without any inventive work, which should be within the scope of the invention.

An embodiment of the invention provides an electromagnetic induction antenna plate, a backlight, and a display device, and can reduce the total thickness of the display device and is helpful for realizing light weight and thinness of the display device.

Figure 1:
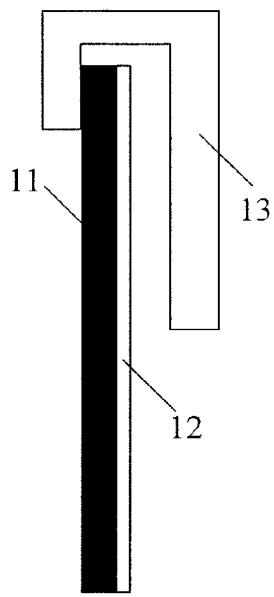
FIG. 1 is a structural schematic view showing a conventional electromagnetic induction antenna plate.
Figure 2:
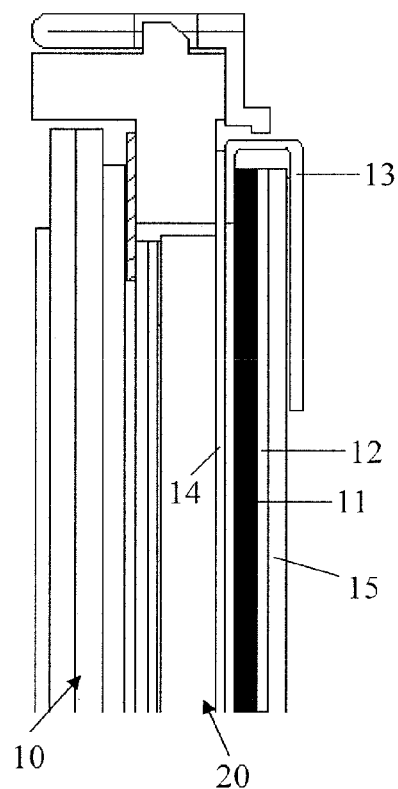
FIG. 2 is a schematic view showing the structure of a backlight after an conventional electromagnetic induction antenna plate is enclosed.
Figure 3:
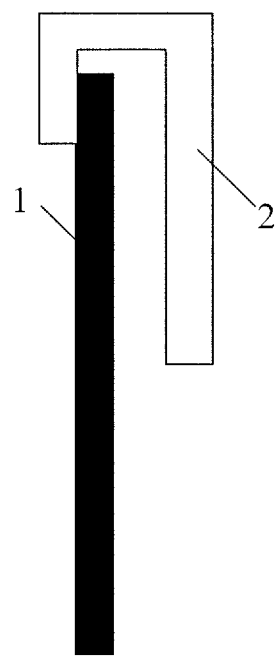
FIG. 3 is a structural schematic view showing an electromagnetic induction antenna plate according to an embodiment of the invention.

As shown in FIG. 3, the electromagnetic induction antenna plate provided by an embodiment of the invention comprises a wiring layer 1 and a fixing structure 2 for connecting the wiring layer 1 with the back plate of a backlight.

The wiring layer 1 has a first surface facing the back plate and a second surface coated with a reflective material and facing the light guide plate of the backlight.

An electromagnetic touch device in the prior art comprises an electromagnetic induction touch control plate, an electromagnetic induction antenna plate, an electromagnetic pen, and a liquid crystal display (LCD) module. The electromagnetic pen acts as a signal emitting terminal, and the electromagnetic induction antenna plate acts as a signal receiving terminal. The silicon steel sheet is mainly used for supporting, and the wiring layer 1 is mainly used for protecting the wires, cables, and etc. In this embodiment of the invention, the silicon steel sheet in the electromagnetic induction antenna plate included in the backlight in the prior art is removed; the first surface of the wiring layer 1 faces the back plate of the backlight, and the second surface of the wiring layer 1 is coated with a reflective material and faces the light guide plate of the backlight. Thus, the wiring layer 1 is provided between the back plate and the light guide plate of the backlight. Preferably, the first surface is attached to the back plate, and the second surface is attached to the light guide plate. The first surface may be directly attached to the back plate so that the thickness of the electromagnetic induction antenna plate can be reduced accordingly; the reflecting sheet of the backlight is omitted, and therefore the second surface coated with a reflective material may be directly attached to the light guide plate so that the reflective material, instead of the reflecting plate of backlight, reflects the light from the light source of the backlight. Preferably, the reflective material is a white or transparent reflective material.

Figure 4:
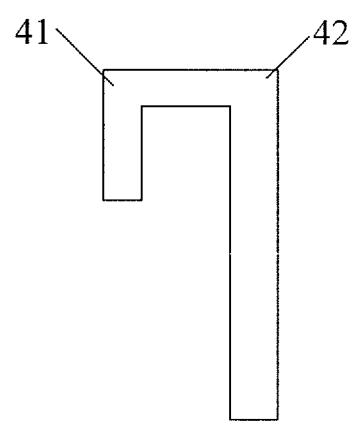
FIG. 4 is a schematic view showing the structure of a fixing structure according to an embodiment of the invention.
Figure 5:
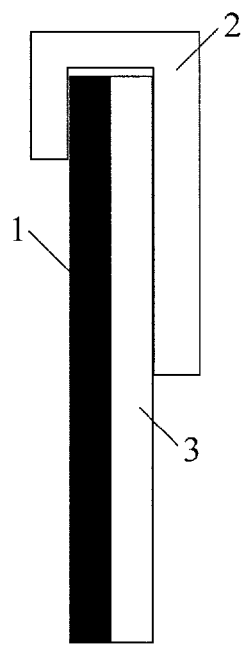
FIG. 5 is a schematic view showing a position of the fixing structure according to an embodiment of the invention.
Figure 6:
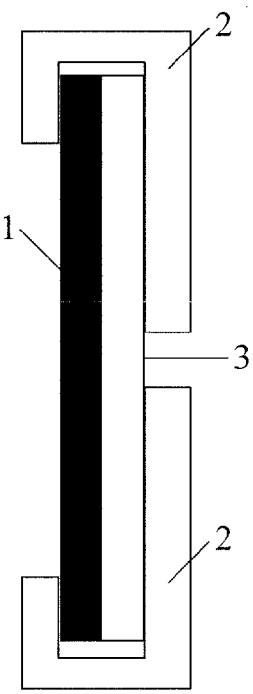
FIG. 6 is a schematic view showing another position of the fixing structure according to an embodiment of the invention.

As shown in FIG. 4, the fixing structure 2 has two right-angle bends (corners), i.e., the first right-angle bend 41 and the second right-angle bend 42. The distance between the two right-angle bends are the sum of thicknesses of the wiring layer 1 and the back plate 3, which can ensure stability between the wiring layer 1 and the back plate 3. The fixing structure 2 may be made of a flexible circuit board, which is capable of freely bending, folding, winding, moving and expanding in the three-dimensional space; therefore, it is easy to prepare the fixing structure 2 with a flexible circuit board, and advantageously for making the display device thinner and lighter. There may be only one fixing structure 2, as shown in FIG. 5, and in this case it is only required that the fixing structure 2 is fixed on one end of the wiring layer 1 and the back plate 3. There also may be two fixing structures 2, as shown in FIG. 6, and in this way, the fixing structure 2 can be fixed on both ends of the wiring layer 1 and the back plate 3, respectively. The number of the fixing structure 2 and the fixed position can be determined in light of actual needs, as long as stability between the wiring layer 1 and the back plate 3 can be ensured.

Preferably, the fixing structure 2 can be formed as an integral structure by injection molding or forging; the fixing structure 2 can also be formed as a spliced structure by splicing.

When the electromagnetic induction antenna plate is arranged into the backlight, the fixing structure 2 may be embedded into or attached to a rubber frame 5 of the backlight. If the fixing structure 2 is embedded into the frame of the backlight, the embedded depth of the fixing structure 2, into the rubber frame 5, may be equal to the thickness of the fixing structure. An adhesive means can be further used for improving the connection stability between the fixing structure 2 and the rubber frame 5 after embedment.

It can be seen from the above description that the electromagnetic induction antenna plate according to the embodiment of the invention can reduce the thickness of the display device as a whole by omitting the silicon steel sheet and the reflecting plate of a conventional backlight while making the wiring layer in direct contact with the back plate and coating a reflective material on the wiring layer so as to replace the conventional reflecting plate.

Figure 7:
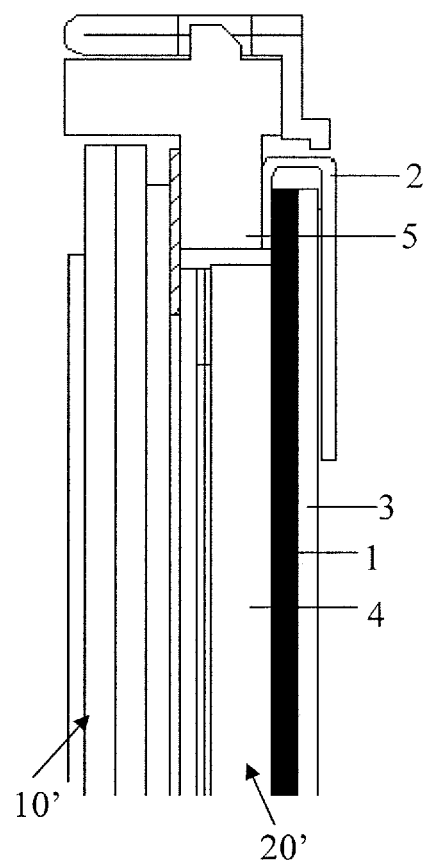
FIG. 7 is a schematic view showing the structure of a backlight according to an embodiment of the invention.

Based on the similar conception, another embodiment of the invention provides a backlight source including the electromagnetic induction antenna plate described above, as shown in FIG. 7. FIG. 7 shows a cross-sectional view of a display device, which comprises a display panel 10' and a backlight 20', and the backlight 20' is provided behind the display panel 10'; the electromagnetic induction antenna plate is enclosed in the backlight 20'. The silicon steel sheet in the conventional electromagnetic induction antenna plate of the backlight in the prior art is removed, and the first surface of the wiring layer 1 is directly attached to the back plate 3 of the backlight 20. Also, the reflecting plate of the backlight is omitted, and the second surface of the wiring layer 1 is coated with a reflective material and then is directly attached to the light guide plate 4 of the backlight. Instead of the reflecting plate, the wiring layer 1 coated with a reflective material functions to reflect the light from the light source. The reflective material is a white or transparent reflective material and has high reflectivity.

Also, the wiring layer 1 and the back plate 3 can be held together by a fixing structure 2, and then the fixing structure 2 can be embedded into the rubber frame 5 of the backlight 20 so that the second surface of the wiring layer 1 that is coated with a reflective material can be in sufficient contact with the light guide plate 4. The rubber frame 5 for example is mainly a polycarbonate (PC) material, or may be mainly a polycarbonate material and a glass fiber material, for supporting a display panel. Preferably, in one example, the fixing structure 2 has two right-angle bends, and the distance between the two right-angle bends are the sum of thicknesses of the wiring layer 1 and the back plate 3, which is helpful to ensure a secured adhesion between the wiring layer 1 and the back plate 3. The fixing structure 2 may be made of a flexible circuit board that is capable of freely bending, folding, winding, moving and expanding in the three-dimensional space; and therefore it is easy to prepare a fixing structure 2 with a flexible circuit board and advantageously making the display device become thinner and lighter. In addition, the fixing structure 2 can be formed as an integral structure by injection molding or forging or can also be formed as a spliced structure by splicing.

Based on the similar conception, a further another embodiment of the invention also provides a display device including the backlight source described above.

It can be seen from the above description that, in the electromagnetic induction antenna plate, the backlight and the display device according to the embodiments of the invention, the wiring layer is in directly contact with the back plate and is coated with a reflective material, and the silicon steel sheet in a conventional electromagnetic induction device and the reflecting plate in a conventional backlight is omitted, and in this way, a display device having an electromagnetic touch control function can be realized with cost saving, and furthermore can be made thinner and more convenient for mass production and application.

It should be obvious for those skilled in the related art that variations and modifications can be made on the invention without departure from the spirit and scope of the invention. Thus, if such variations and modifications to the invention are within the claims and any equivalents thereof, all such variations and modifications are intended to be comprised within the scope of the invention.

The invention claimed is:
1. A backlight comprising:
a back plate,
a light guide plate, and
an electromagnetic induction antenna plate that is provided between the light guide plate and the back plate, wherein the electromagnetic induction antenna plate comprises:
a wiring layer, and
a fixing structure;
wherein the fixing structure wraps around the wiring layer and the back plate and attaches the wiring layer to the back plate, wherein the fixing structure is disposed on at least one end of the wiring layer, exposing a middle portion of the wiring layer;

wherein the wiring layer comprises a first surface and a second surface, the first surface of the wiring layer faces the back plate, and the second surface of the wiring layer is coated with a reflective material and faces the light guide plate, and wherein the light guide plate is disposed outside of the fixing structure and is not fixed by the fixing structure.

2. The backlight according to claim 1, wherein the first surface of the wiring layer is attached to the back plate, and the second surface is attached to the light guide plate.

3. The backlight according to claim 1, wherein the fixing structure has two right-angle bends, and a distance between the two right-angle bends are a sum of thicknesses of the wiring layer and the back plate.

4. The backlight according to claim 1, wherein the backlight comprises a rubber frame and the fixing structure is embedded into or attached to the rubber frame.

5. The backlight according to claim 4, wherein an embedded depth of the fixing structure into the rubber frame is equal to a thickness of the fixing structure.

6. The backlight according to claim 1, wherein the fixing structure is made of a flexible circuit board.

7. The backlight according to claim 1, wherein the reflective material is a white reflective material.

8. A display device comprising a display panel and the backlight according to claim 1.

9. The backlight according to claim 1, wherein the second surface of the wiring layer faces the light guide plate through the exposed portion of the fixing structure.

10. The backlight according to claim 1, wherein the wiring layer is in direct contact with the light guide plate of the backlight.

* * * * *